July 25, 1967        P. MLADENOVICH        3,332,288
DEVICE FOR SAMPLING MOLTEN METAL
Filed May 17, 1965
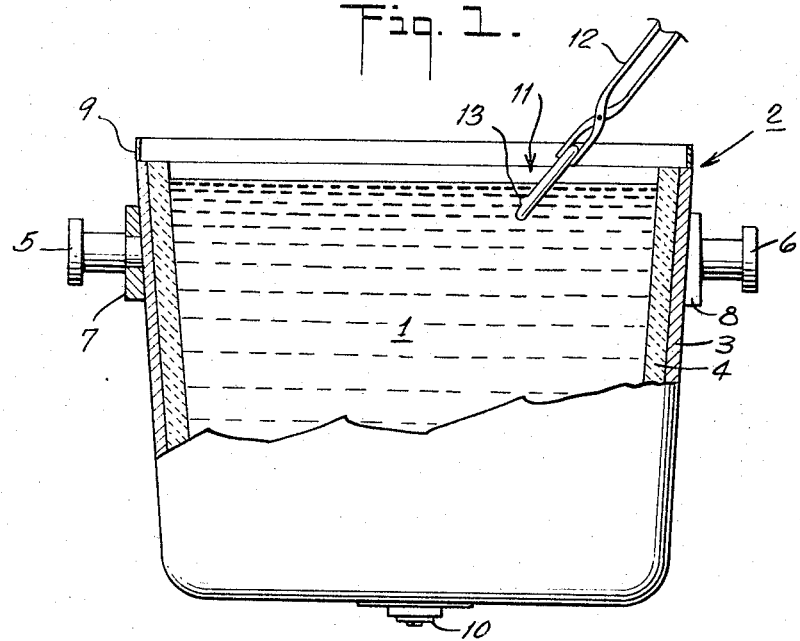
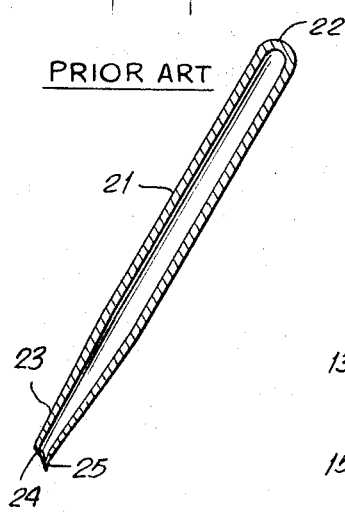
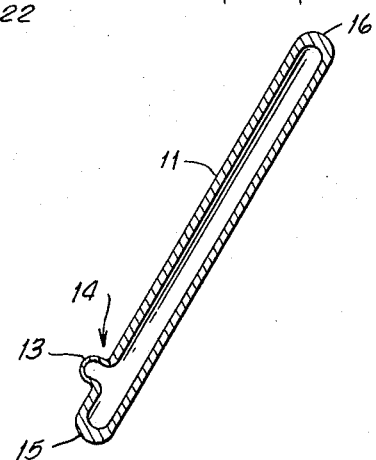
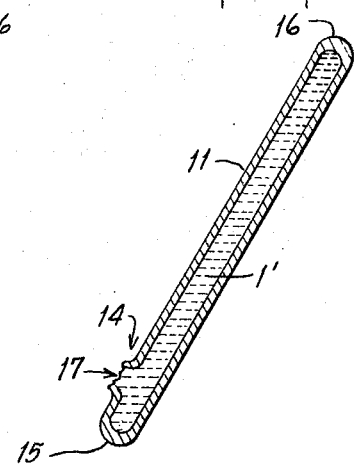
INVENTOR.
PETER MLADENOVICH
BY Lester H. Clark
ATTORNEY

United States Patent Office 3,332,288
Patented July 25, 1967

3,332,288
DEVICE FOR SAMPLING MOLTEN METAL
Peter Mladenovich, Toronto, Ontario, Canada, assignor to Burgener Technical Enterprises Limited, West Toronto, Ontario, Canada, a corporation of Canada
Filed May 17, 1965, Ser. No. 456,443
5 Claims. (Cl. 73—425.6)

ABSTRACT OF THE DISCLOSURE

Apparatus for sampling molten metal, comprising an elongated tube, evacuated and having a weakened portion of limited extent, near but spaced from one end of the tube. End with weakened portion is thrust into metal, which breaks weakened portion and flows into and fills the tube. Method of making tube from heat resistant glass by glass blowing techniques.

This invention relates to a device for sampling molten metals, and, more particularly, to an improved vacuum sampling tube insertable into a mass of molten metal for recovering a sample of the molten metal.

In the refining of ore to recover commercially usable metal, it is common practice to sample the metal periodically while in a molten state. For example, in refining iron ore to produce steel, a heat of iron ore and various additives is melted in a furnace, such as an open hearth furnace. At the termination of the melting period, it is necessary to obtain a sample of the heat for analysis to determine what further procedures must be followed in order to achieve a desired composition in the final product.

Following the melting period, the heat of molten material within the furnace is processed further, during what is termed the working period or the refining period. Samples are needed during the working period to chart the progress of the refining process. The finishing temperature of a basic open hearth steel heat, at the end of the working period, is in the neighborhood of 3,000° F., varying according to the composition and the grade of the steel being produced. The furnace is tapped and the molten metal flows out of the furnace and onto a tapping spout which directs it into a ladle. The molten metal again is sampled, either as it is received within the ladle or after the ladle has been filled.

Due to the high temperature of the molten metal, the sampling is a relatively difficult and somewhat dangerous task. Many methods of sampling molten metal have been developed in the prior art; however, the method generally followed is to use a spoon or sampling ladle to remove a small quantity of molten metal from the furnace or from the ladle which receives the flow of metal from the furnace when the latter is tapped. The sample then is obtained from this small quantity of the metal in the sampling spoon or ladle.

In accordance with another prior art method, a vacuum sampling tube is inserted into a mass of molten metal, such as contained in a furnace or a ladle, to recover a sample. The sampling tube is formed of a length of glass tubing of relatively small bore which is closed at one end and evacauted to create a pressure differential of the interior relative to atmospheric pressure. While the pressure differential is maintained, a portion of the tubing, displaced from the first closed end, is heated and drawn to a thin-walled, tapered configuration and a small closure tip is formed at the narrow end of the tapered portion. The sampling tube is thrust rapidly, with the thin-walled, tapered end portion foremost, into the mass of molten metal. When the prior art sampling tube functions properly, the tapered end portion will melt quickly, or in some cases shatter, producing an opening or entrance to the interior of the sampling tube; the remainder of the sampling tube, however, stays intact and molten metal flows through the opening and into the remainder of the sampling tube by virtue of the pressure differential.

A serious difficulty is encountered in the use of such prior art vacuum sampling tubes. Frequently, the tapered end portion does not shatter or melt sufficiently rapidly to produce an opening, but rather the walls thereof melt and collapse, closing the entrance to the sampling tube. Further, it appears that occasionally only the small closure tip melts or shatters and the aperture thus provided is too small to permit the flow of molten metal into the tube; the small closure tip also is subject to melting and blocking the entrance to the tube. Regardless of the exact nature of the malfunctioning, the result is that no passageway to the tube interior is provided and the prior art device is ineffective in obtaining a sample.

In practice, it has been found that, on the average, a minimum of one out of five of the prior art sampling tubes malfunctions in this manner. Although a single prior art sampling tube is relatively inexpensive, a great number of sampling tubes are employed every day in metal refineries, and the malfunctioning thereof results in a rather considerable and unnecessary expense. Other unnecessary expenses are also incurred due to the malfunctioning, such as the duplication of effort on the part of the workman in taking a second sample and the resultant delay in the analysis of the sample for determining what may be critical controls in the refining process.

The vacuum sampling tube of the invention overcomes these and other deficiencies of prior art vacuum sampling tubes and, in addition, is easier and more economical to manufacture.

It is therefore an object of this invention to provide an improved vacuum sampling tube which is highly reliable and effective in obtaining samples of molten metals.

A further object of this invention is to provide a vacuum sampling tube of improved construction and of reduced manufacturing cost which is highly reliable and effective in obtaining samples of molten metals.

These and other objects of this invention will become apparent as the following description proceeds.

In accordance with a preferred embodiment of the invention, the vacuum sampling tube is formed from a length of tubing having a relatively small bore. The tubing is of glass or other suitable material having a melting point which is considerably below that of the metal to be sampled. The tubing is closed initially at a first end. A portion of limited area of the tubing sidewall adjacent the first closed end is heated and, by blowing, is stretched and reduced from its original thickness to form a thin-walled bubble protruding radially outwardly from the sidewall. The tubing is evacuated to produce a pressure differential of the interior relative to atmospheric pressure, and the other end of the tubing then is closed. In obtaining a sample, the sampling tube is inserted rapidly, with the first closed end foremost, into a mass of molten metal.

Since the temperature of the molten metal is considerably in excess of the melting point of the material comprising the sampling tube, the thin walled bubble is melted or shattered, due to thermal shock, to produce an aperture in the tube sidewall. The bubble melts or shatters while the remainder of the tube stays intact. The molten metal flows rapidly through the aperture and into the tube by virtue of the pressure differential.

The molten metal received in the sampling tube solidifies almost instantaneously, forming a rod-like sample of metal. The sampling tube, with the sample therein, is removed immediately from the molten metal. The remainder of the sampling tube then is broken off and the rod-like sample of the metal is recovered.

For a better understanding of the invention, reference may be had to the following description and drawings, in which:

FIGURE 1 shows, in cross section, a schematic representation of a steel ladle containing a mass of molten metal into which is inserted a vacuum sampling tube, in accordance with the invention, for obtaining a sample of the molten metal;

FIGURE 2 shows a prior art vacuum sampling tube;

FIGURE 3 shows a vacuum sampling tube in accordance with the invention; and

FIGURE 4 shows a vacuum sampling tube in accordance with the invention, subsequent to its use in recovering a sample of molten metal.

As noted above, the sampling of molten metal is performed at various times during the refining process.

FIG. 1 illustrates the taking of a sample of a mass 1 of molten metal which has been transferred to a ladle 2 from a furnace (not shown). The ladle 2, in accordance with standard practice, includes an outer steel shell 3 and an inner lining 4 of refractory material. The ladle 2 is supported on mounts (not shown) by a pair of trunnions 5 and 6, respectively. A guard plate 9 surrounds the top of the steel shell 3 to assist in preventing splashing.

The ladle 2 is transportable, for example by a crane (not shown) which connects to the trunnions 5 and 6, for transferring the mass 1 of molten metal to subsequent refining apparatus, or to ingot molds or the like. A nozzle 10 is provided in the bottom of the ladle 2, extending through the steel shell 3 and the refractory lining 4 and communicating with the interior of the ladle 2. The nozzle 10 is adjustable from a closed to an open position to transfer the mass 1 of molten metal, by gravity flow, from the ladle 2 to subsequent receiving apparatus.

A vacuum sampling tube 11, formed in accordance with the invention (and shown in greatly enlarged scale relative to the ladle 1) is inserted below the surface of the mass 1 of molten metal by a pair of tongs 12. The use of tongs 12 or similar devices is necessary to protect the workman taking the sample from exposure to the intensely high temperature, and from possible splashing, of the mass 1 of molten metal.

The vacuum sampling tube 11 is of an elongated, generally cylindrical shape and includes a thin-walled bubble 13 extending radially outwardly from its sidewall adjacent one of its ends. The bubble 13 has thinner walls, and thus is structurally weaker, than the remainder of the sampling tube 11. During its manufacture, the sampling tube 11 is evacuated to produce a pressure differential between its interior and atmospheric or ambient pressure.

To obtain a sample of the mass 1 of molten metal, the sampling tube 11 is thrust rapidly into the mass 1 by the tongs 12 to an extent sufficient to dispose at least the bubble 13 and the associated end portion of the sampling tube 11 below the top surface of the mass 1. The bubble 13 ruptures, such as by melting or shattering, almost immediately upon insertion into the mass 1 as a result of the large difference between the temperature of the molten metal and the melting point of the material from which the sampling tube is formed, or due to the thermal shock experienced upon the abrupt change in temperature from that of the ambient atmosphere to that of the molten metal and, occasionally, due to mechanical action with the molten metal.

The rupturing of the bubble 13 produces an aperture in the sidewall of the sampling tube 11, providing a passageway to its interior. The remainder of the tube 11, however, has sufficient heat capacity and strength, such that it remains intact. Due to the pressure differential, the molten metal flows rapidly through the passageway and into the sampling tube 11. The heat capacity and strength of the remainder of the tube 11 is also sufficient such that the molten metal received therein solidifies before the tube 11 can melt or shatter. The sampling tube 11 need be inserted only momentarily for effecting the rupturing of the bubble 13 and for the resultant flow of the molten metal into the tube 11 and its solidification therein to occur, and is withdrawn by the tongs 12 almost immediately following the insertion.

The improved construction of the vacuum sampling tube 11 of the invention and its improved operation over the vacuum sampling tube of the prior art will be appreciated more readily with reference to FIG. 2, which shows a prior art vacuum sampling tube, and FIGS. 3 and 4 which show the vacuum sampling tube 11 of the invention before and after use in recovering a sample of molten metal, respectively, and on an enlarged scale, relative to FIG. 1.

As shown in FIG. 2, the prior art vacuum sampling tube 21 includes a first closed end 22 and a tapered end portion 23 terminating in a second closed end 24. In manufacturing the sampling tube 21, the first end 22 is closed and the interior of the sampling tube 21 is evacuated. While connected to the evacuation means (not shown), a portion of the tube walls displaced from the first closed end 22 is heated and drawn to a cone-shaped configuration, providing a tapered end portion 23. The drawing reduces the wall thickness in the tapered end portion 23 and decreases the interior diameter thereof. The walls of the end 23 are heated further and formed to close the end 24 with a thin-walled closure tip 25.

The prior art sampling tube 21 is employed in a manner similar to that of the sampling tube 11 of the invention, as shown in FIG. 1. The sampling tube 21 is thrust rapidly, with the tapered end portion 23 foremost, into a mass of molten metal. When the prior art sampling tube 21 functions properly, the thermal stresses due to the rapid change in temperatures cause the thin-walled tapered end portion 23 to rupture, as by shattering or melting, and to produce a passageway through which the molten metal flows into the interior of the sampling tube 21, due to the pressure differential.

Frequently, however, the tapered end portion 23 does not rupture quickly enough to produce the required passageway to allow the molten metal to flow into the tube 21, but rather the complete end of the tube 11 collapses, thus sealing and blocking the passageway to the interior of the tube 11. In such case, no sample is recovered and the workman must attempt to obtain the sample a second time. As noted above, this malfunctioning of the prior art sampling tube 21 occurs, on the average, in one out of five attempted sampling operations. It is believed that this malfunction is inherent in the tapered configuration of small cross-sectional area, which may be plugged by even a small amount of molten glass.

The vacuum sampling tube 11 of the invention, shown in detail in FIG. 3, overcomes this deficiency of the prior art vacuum sampling tubes by virtue of its improved construction. The vacuum sampling tube 11 of the invention is formed from a length of glass tubing having a relatively small bore. The tubing is heated and formed to provide a first closed end 15. A portion of limited area in both circumferential and axial extent, generally designated by the numeral 14, on the sidewall adjacent the first closed end 15, is heated and blown to form a bubble 13. The bubble has a generally hemispherical configuration and is of a diameter approximately equal to, or larger than, that of the glass tubing. Finally, the sampling tube 11 is evacuated to produce a pressure differential in the interior thereof relative to atmospheric pressure, and the second end 16 is heated and closed.

The sidewalls and the ends 15 and 16 of the sampling tube 11 are designed to be sufficiently strong to withstand momentarily the heat and the thermal shock to which the sampling tube 11 is subjected upon insertion into the mass 1 of molten metal. The reduced wall thickness in the bubble 13, however, renders the latter thermally and structurally weaker than the remainder of the sampling tube 11.

The stretching of the glass in the portion 14 of the sidewall reduces the thickness of the wall of the bubble 13 and correspondingly reduces its thermal capacity. Thus, when the tube 11 is thrust into the molten metal, the temperature of the wall of the bubble 13 will rise much more rapidly than that of the relatively thicker remaining portions of the sampling tube and as a result, the melting point of the tube material will be reached more rapidly in the bubble 13 than in the relatively thicker walled portions of the remainder of the tube 11.

The use of the vacuum sampling tube 11 of the invention has been shown and described with reference to FIG. 1. The functioning of the sampling tube 11, however, will be appreciated more fully with reference to FIG. 4 which shows the sampling tube 11 subsequent to its use in recovering a sample 1' of molten metal.

Upon insertion of the sampling tube 11 into a mass of molten metal, the bubble 13 ruptures almost immediately and produces an aperture 17 providing a passageway into the interior of the sampling tube 11. As a result of the pressure differential, the molten metal flows rapidly through the passageway provided by aperture 17 and a sample 1' of the molten metal is contained within the tube 11. Due to the rapidity with which the rupturing of the bubble 13 and the flow of molten metal occur, the tube 11 need be inserted only momentarily, and is almost immediately withdrawn following the insertion. Since the period of insertion is of such short duration, the remainder of the sampling tube 11 is substantially unaffected by the molten metal and is relatively intact upon withdrawal.

The sidewall of the sampling tube 11 in the region thereof immediately adjacent to, and surrounding the portion 14 is substantially unmodified during the formation of the bubble 13 and thus is of sufficient structural and thermal strength to withstand the heat and thermal stresses experienced upon insertion of the sampling tube 11 into the molten metal. The sidewall therefore maintains the aperture 17 and the passageway which it provides and guarantees that an unimpeded, rapid flow of the molten metal into the sampling tube 11 occurs.

The sampling tube 11 remains intact with the exception of the ruptured bubble, and contains the solidified sample 1' upon removal from the mass of molten metal. The sample 1' is protected from contamination and oxidation by being encased within the sampling tube 11. After cooling, the sample 1' is recovered by removing the remainder of the sampling tube 11.

Since the diameter of the bubble 13 is about the same as, or larger than, that of the cylindrical walls of the sampling tube 11, the aperture 17 produced upon rupturing of the bubble 13 is not easily plugged by molten glass. Furthermore, the aperture 17 produced upon the rupturing of the bubble 13 always provides a relatively wide opening, or passageway, for the flow of molten metal into the interior of the sampling tube 11. By contrast, if the prior art sampling tube 21 ruptures near the end 24, the cross-sectional area of the passageway opened to the flow of molten metal is severely restricted, and increases the time required to fill the tube. The increased time period for obtaining the sample is critical in that the longer the sampling tube 21 remains in the mass 1 of molten metal, the greater is the possibility that the tube sidewalls, particularly in the tapered end portion 23, will melt together and collapse, blocking the flow of molten metal.

In addition to the greater reliability, and hence reduced unit cost of the sampling tube 11 of the invention, in use, it is also less expensive to manufacture than the prior art sampling tube 21. Manufacturing the sampling tube 11 of the invention requires merely the formation of a standard end closure 15 in a length of glass tubing and the blowing of a bubble 13 on the sidewall of the tubing. The tubing then is evacuated and a portion thereof displaced from the closed end 15 is heated and formed to provide the second closed end 16, the forming of the closed end 16 being a technique which is well known in the art and which is performed easily.

By contrast, in manufacturing the prior art sampling tube 21, the end 24 is closed and the tubing is evacuated. The end portion 23 then is heated to a sufficiently fluid condition for drawing. When so heated, the sidewalls inherently tend to contract; in addition to the inherent force of contraction, the axially directed force of the drawing and the radially inwardly directed force of atmospheric pressure create a resultant force having the effect of collapsing the sidewalls of the tapered end portion 23. If the sidewalls collapse too quickly, the tapered end portion 23 is too short in axial length and the sampling tube thus formed must be discarded as a reject. Even if the sidewalls do not collapse completely, the interior spacing or separation of the sidewalls may become so small that the tapered end portion 23, rather than being weakened, is strengthened. If the defect is not recognized and the tube not discarded as a reject, it will malfunction in the manner hereinbefore described, the tapered end portion 23 melting and forming a plug preventing the taking of the sample.

Another problem encountered in the production of the prior art sampling tube 21 is that the closed end 24 and the tip 25 must be formed in the weakened end portion 23, further presenting the possibility of collapsing the sidewalls. In addition, the drawing for forming the weakened end portion 23 results frequently in unevenness in the contour and thickness of the sidewalls of the end portion 23, increasing the possibility of malfunctioning of the sampling tube 21 in use.

It readily will be appreciated that the vacuum sampling tube of the invention may be employed for sampling materials other than molten metals, provided that such materials, when in a molten state, are of a sufficiently high temperature to produce the requisite rupturing of the bubble, while the remainder of the tube remains intact.

The use of glass as the material from which the sampling tube is formed constitutes a preferred embodiment of the invention; however, other materials, such as low melting point ceramics and low melting point metals, may be employed in the alternative. The material selected, however, must be sufficiently thermally resistant that, with the exception of a weakened portion in the sidewall of the tube, the tube can withstand the thermal and, occasionally, mechanical shock to which it is subjected upon insertion into the molten metal. In a sampling tube formed of metal or of ceramic, the weakened portion conveniently may be formed by grinding or molding a portion of the sidewall to reduce its thickness relative to the remainder thereof; further, the sidewall may be molded to include a protruding, thin-walled portion similar to the bubble 13. Upon insertion of the tube into a mass of molten metal, the weakened portion of the sidewall would be subject to rupturing as by melting or shattering more quickly than the remainder of the tube, as hereinbefore described. The shattering will produce an aperture or entrance through which the molten metal may flow into the tube in recovering a sample of the molten metal.

In summary, the vacuum sampling tube of the invention is easier to manufacture and lower in cost of manufacture than the prior art devices heretofore produced. In addition, the vacuum sampling tube of the invention has higher reliability, and thus is more efficient and lower in cost, in use, than the prior art devices.

Many modifications and adaptations of the device of the invention will be apparent to those skilled in the art and thus it is intended by the appended claims to cover all such modifications and adaptations as fall within the true spirit and scope of the invention.

What I claim is:

1. A device for sampling molten material comprising:
   (a) an elongated tube closed at both ends and evacuated to produce a pressure differential between the interior of said tube and atmospheric pressure;
   (b) said tube including a weakened portion of limited axial and circumferential extent in the sidewall of said tube spaced axially inwardly from the ends thereof;
   (c) said weakened portion being adapted to rupture upon insertion into a mass of molten material to produce an aperture in said sidewall for receiving a flow of said molten material into the interior of said tube.

2. A device as recited in claim 1 wherein said weakened portion protrudes radially outwardly from said sidewall.

3. A device as defined in claim 1, in which said weakened portion has a diameter of the same order of magnitude as that of the tube.

4. A device for sampling molten metal comprising:
   (a) an elongated glass tube closed at both ends and evacuated to produce a pressure differential between the interior of said tube and atmospheric pressure;
   (b) a bubble in the sidewall of said tube protruding radially outwardly therefrom adjacent one of said ends;
   (c) said bubble being adapted to rupture upon insertion into a mass of molten metal to produce an aperture in said sidewall for receiving a flow of said molten metal into the interior of said tube.

5. A device as recited in claim 4 wherein said bubble has a reduced wall thickness relative to the remainder of said glass tube.

References Cited
UNITED STATES PATENTS 2,485,492   10/1949   Hubbard _____ 73—425.4
2,970,350   2/1961   Feichinger.

LOUIS R. PRINCE, *Primary Examiner.*

S. C. SWISHER, *Assistant Examiner.*